United States Patent Office 3,389,324
Patented June 18, 1968

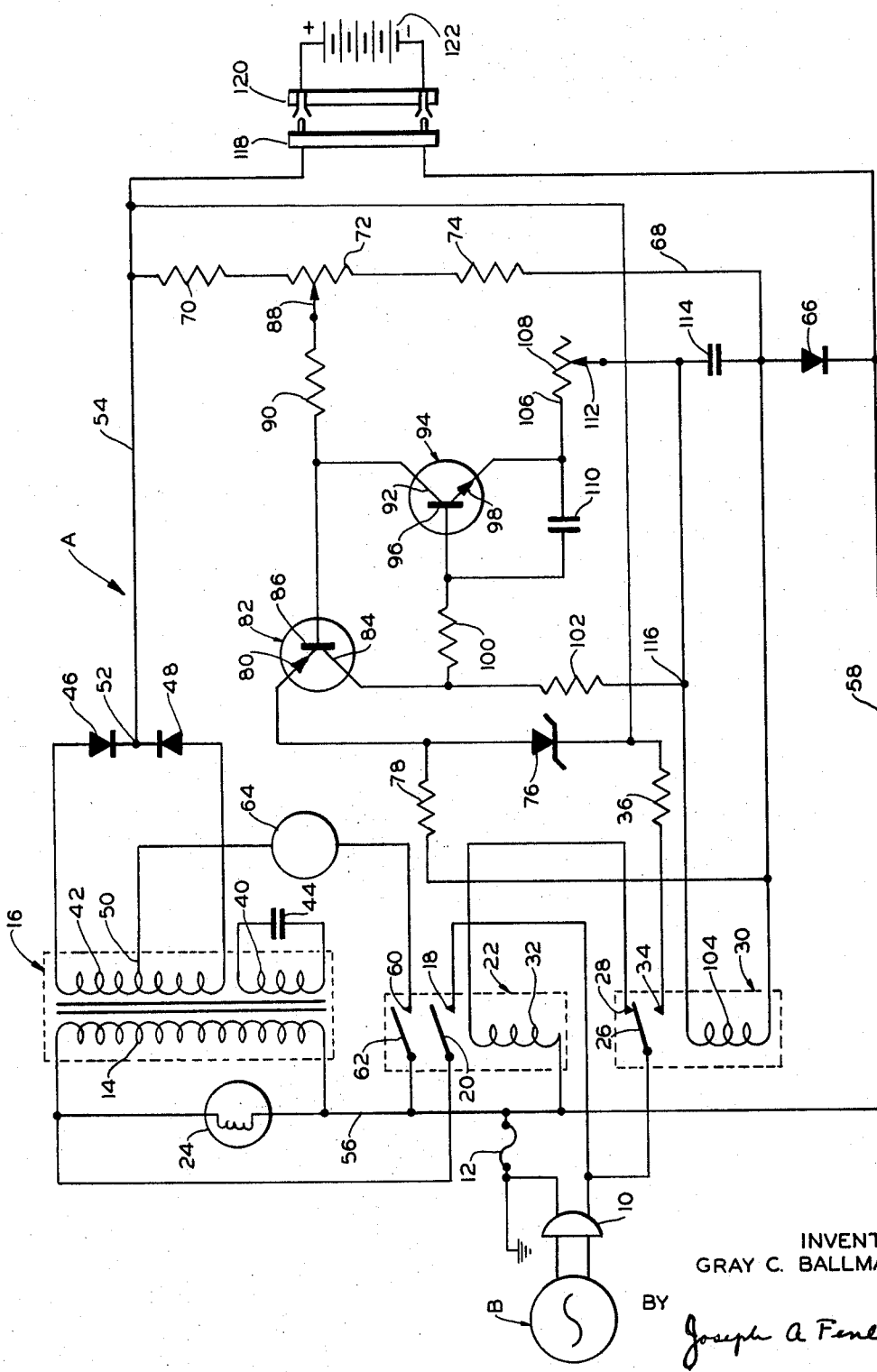

3,389,324
REGULATED BATTERY CHARGERS
Gray C. Ballman, St. Louis County, Mo., assignor to Chargematic, Inc., a corporation of Missouri
Filed May 26, 1965, Ser. No. 459,043
5 Claims. (Cl. 320—25)

ABSTRACT OF THE DISCLOSURE

This invention discloses a regulated battery charger which utilizes regeneratively coupled transistors as on-off switches to turn charging current on and off as a battery becomes discharged and charged respectively, which also uses said transistors to turn off charging current when no battery is connected to the charge terminals and which also uses said transistors to prevent the charging current from flowing through the battery when the battery is connected to the charger with reverse polarity.

---

This invention relates to battery chargers.

In many situations today, demands exist for battery chargers which may be used by those relatively inexperienced with the art of charging batteries. Probably the most typical situation is presented to the operators of the golfing pro-shops who must see to the continual recharging of the battery operated golf carts overnight so that they might be reused the following day. A need therefore exists for an automatic battery charger which will sense the needs of the battery, operator accordingly, and actually have very little, if any, dependence on the skill of the operator.

It is the object of this invention to provide a completely automatic battery charger in which the operation of the charger is controlled by the demand of the batteries being charged.

It is a further object of this invention to provide a battery charger of the type described which is short circuit proof, whereby to prevent careless operators from being shocked, burnt and hurt by their own carelessness.

It is also an object of the present invention to provide a battery charger of the type described which is constructed in such manner to prevent damage from situations of reverse polarity.

With the above and other objects in view, which will become immediately apparent upon reading the specification, this invention resides in the unique and novel form, arrangements, construction and combination of the various parts hereinafter described and claimed.

In the drawings:

The figure represents an electrical schematic diagram of a battery charger constructed in accordance with the present invention.

Referring now in more detail and by reference character to the drawings, which illustrate a preferred embodiment of my invention, A designates a battery charger which is conventionally connected to a standard source B of alternating current power through a plug 10. The alternating current power is thereupon applied to a simple series circuit comprising a fuse 12, the primary 14 of a transformer 16, and two contacts 18, 20, of a normally open double pole single throw relay 22. Connected across the primary 14 of the transformer 16 is a pilot light 24 and also connected across the line from the contact 18 to the transformer side of the fuse 12 in series with two normally closed contacts 26, 28, of a single pole double throw relay 30 is the coil 32 of the relay 22. The other contact 34 of the rotary 30 is connected to one end of a resistor 36.

Two separate coils 40, 42 comprise the secondary of the transformer 16. The first coil 40 has a capacitor 44 connected directly across it for purposes presently more fully to appear. The second coil 42 has two opposing diodes 46, 48 connected across its outer terminals for full wave rectification and is also provided with a center tap 50.

The common connection 52 of the opposed diodes 46, 48, is used as a positive bus 54 and the fused side 56 of the alternating current line is a negative bus 58.

Two contacts 60, 62, of the normally open relay 22 are in series with an ammeter 64 between the center tap 50 and the negative bus 58. Connected to the negative bus 58 through a blocking diode 66 is a secondary bus 68, and located between the positive bus 54 and the secondary bus 68 is a voltage divider circuit comprising a resistor 70, a potentiometer 72, and a resistor 74. Also provided between the positive bus 54 and the secondary bus 68 is a Zener diode 76 in series with a resistor 78. The other end of the resistor 36 is connected to the positive bus 54.

Connected to the common junction of the Zener diode 76 and the resistor 78 is the emitter 80 of a PNP transistor 82 also having a collector 84 and a base 86. The base 86 is connected to the wiper arm 88 of the potentiometer 72 through a resistor 90 and is also directly connected to the collector 92 of an NPN transistor 94, which also includes a base 96 and an emitter 98. The collector 84 of the transistor 82 is connected to the base 96 of the transistor 94 through a resistor 100. The collector 84 is also connected to the negative bus 68 through a resistor 102 in series with the coil 104 of the relay 30.

The emitter 98 of the transistor 94 is connected to one end 106 of a potentiometer 108 and is also connected to the base 96 through a capacitor 110. The wiper arm 112 of the potentiometer 108 is connected to the negative bus 68 through a capacitor 114 and is also connected directly to the common junction 116 of the resistor 102 and the relay coil 104.

The buses 54, 58 are respectively connected to positive and negative sides of a plug 118 conventionally adapted for mated engagement with a second plug 120 to which is connected a battery 122.

Table I presents typical values for the various components described for use with a golf-cart type battery charger when the battery voltage is 36 volts.

Table I

Resistors: Ohms
36 _____ 1500
70 _____ 470
74 _____ 470
78 _____ 12K
90 _____ 2.2K
100 _____ 330
102 _____ 1K
Diodes:
46 _____ Silicon rectifier diodes.
48 _____ Do.
66 _____ IN2069.
78 _____ 1 watt—22 volt Zener.
Transistors:
82 _____ PNP, 2N404A
94 _____ NPN, 2N1302.
Capacitors:
44 _____ 15 mfd., 330 v.
110 _____ 10 mfd., 50 v.
114 _____ 10 mfd., 50 v.
Potentiometers: Ohms
72 _____ 0–600
108 _____ 0–1500

In use the charger A is always connected to the source of alternating current power B. When the battery 122 is connected to the charger A through the plug 118 and the charging cycle is initiated by the de-energization of the coil 104 in the relay 30 (which will be explained in more detail later), alternating current will flow through the normally closed contacts 26, 28 of the relay 30 and the coil 32 of the relay 22, causing the relay 22 to energize and establish circuit continuity between contacts 18 and 20 and between the contacts 60 and 62, whereupon alternating current will flow in the primary 14 and the secondaries 40, 42 of the transformer 16. The Zener diode acts like a filter circuit on the D.C. voltage output of the full-wave rectified voltage provided from the secondary 42 and the diodes 46, 48, and direct current will flow from the positive bus 54 to the negative bus 58 and back to the center tap 50 through the battery 122, thereby charging the battery 122.

The D.C. voltage between the positive bus 54 and the negative bus 58 will exactly equal the battery terminal voltage. Therefore, as the battery 122 charges and its terminal voltage increases, the D.C. voltage between the buses 54, 58 will also increase.

With the battery 122 connected properly, current will continuously be flowing from the positive bus 54 through the Zener 76, the negative bus 68, the diode 66, to the negative bus 58. The Zener diode 76 will keep the emitter 80 of the transistor 82 at a fixed level below the potential of the positive bus 54.

As long as the terminal voltage of the battery 122 is below a predetermined level, no current will flow through the transistors 82 and 94, and the potential of the base 86 will be the same potential as the wiper arm 88 of the potentiometer 72. The wiper arm 88 of the potentiometer 72 is set at a point which will make the base 86 of the transistor sufficiently negative with respect to the emitter 80 as to cause conduction of the transistor 82 when the battery 122 has a terminal voltage indicative of a fully charged condition. Conduction of the transistor 82 immediately causes conduction of the transistor 94 because of the regenerative coupling of the two, and the two transistors remain in conduction until both the base 86 of the transistor 82 becomes less negative with respect to the emitter 80 and the transistor 82, and the emitter 98 of the transistor 94 becomes more positive with respect to the base 96 of the transistor 94. The latter relation is controlled by the potentiometer 108. When the transistors 82, 94 conduct, current from the transistor 82 flows from the emitter 84 through the resistor 102, the coil 104, the diode 66, the bus 58, back through the transformer 16, to the positive bus 54, and back through the Zener 76 to the emitter 80. Current from the base 86 flows through the collector 92 of the transistor 94 where part of it flows back to the emitter 84 from the base 96 through the resistor 100. Current from the emitter 98 flows through the potentiometer 108, the coil 104, the diode 66, the transformer 16, to the positive bus 54, where it thereafter flows through the resistor 70, the potentiometer 72, the resistor 90 and back to the collector 92.

When current flows through the coil 104 of the relay 30, the relay 30 is energized and continuity is broken between the contacts 26, 28. This breaking of contact between the contacts 26, 28, stops the flow of current through the coil 32 of the relay 22 and de-energizes both the A.C. and D.C. circuits by breaking electrical continuity between the contacts 18, 20 and the contacts 60, 62.

However, it should be noted that de-energization of the relay 22 does not stop the operation of the circuit. On the contrary, only the supply of full-wave rectified alternating current to the battery is stopped. The energization of the relay 30, establishes continuity, between the relay elements 26, 34, and connects one side of the alternating current line directly to the positive bus 54 through the resistor 36. This latching condition creates a full-wave alternating current potential between the positive bus 54 and the negative bus 58, and a half wave alternating current potential between the positive bus 54 and the secondary bus 68. The size of the resistor 36 has been selected so that the effective D.C. voltage between the positive bus 54 and the secondary bus 68 will be sufficient to keep the transistor 82 in conduction when the battery 122 is disconnected, for purposes presently more fully to appear.

It should be noted that so long as the battery 122 is connected to the charger A, the D.C. voltage between the positive bus 54 and the negative bus 58 will always exactly equal the terminal voltage of the battery 122. This value will not change when alternating current voltage (which has an effective D.C. value of zero, and which is non-injurious to the battery 122) is applied across the buses 54, 58 by operation of the relay 22.

After the battery has been charged, and the relay 30 energized, the relay 30 is held in the energized position by current from the battery 122 and half wave current supplied through the resistor 36 until such time as the battery loses sufficient charge for its terminal voltage to drop to a point where the transistors 82 and 94 will stop conducting. At this time, the relay 30 is de-energized and the relay 22 is re-energized, causing D.C. current to flow once more through the battery 122, until it regains its full charge. The potentiometer 72 is used to set the upper value of battery terminal voltage at which the transistors 82 and 94 start conducting. For 36 volt batteries, this is approximately 44 volts. The potentiometer 108 is used to set the lower value of battery terminal voltage at which the transistors 82 and 94 will stop conducting, de-energizing the relay 22, and turning the charger A back on. For 36 volt batteries, the suggested setting is 34 volts. Thus, it can be seen the operation of the battery charger A is completely automatic and a function of the battery terminal voltage.

As was said before, the charger A is always connected to the source of alternating current power B. If no battery 122 is connected to the charger A at the time alternating current is first applied, a D.C. voltage will first be applied across the buses 54, 58, from the full wave rectifier, which said D.C. voltage will be sufficiently high to cause the transistors 82, 94, to go into conduction and cause the relay 30 to become energized. This energizing of the relay 30, applies the aforementioned half-wave alternating current voltage across the positive bus 54 and the secondary bus 68, which said voltage is sufficient to keep the transistors 82, 90, in conduction and hold the relay 30 in the energized position until such time as a discharged battery 122 is connected to the charger A. At such time, the D.C. voltage across the buses 54, 58 will be reduced to a value where the relay 30 will become de-energized and the relay 22 will energize.

If a battery 122 is connected to the charger A with reverse polarity, the blocking diode 66 will prevent battery current flow between the positive bus 54 and the negative bus 58. Because the entire negative voltage will be imposed across the blocking diode 66, the half wave alternating current voltage supplied through the resistor 36 will continue to cause the transistors 82, 94, to remain in conduction and the relay 22 to remain energized.

The capacitor 44 is conventionally used for regulation. The capacitors 110, 114 are used to filter noise and transients.

It should be noted that changes and alternations may be made and substituted in the form, arrangement, combination and construction of the various parts herein shown without departing from the nature and principle of my invention.

Having thus described my invention, what I claim and desire to secure by Letters Patent is recited in the following claims.

1. An automatic battery charger for charging a battery and including direct current power supply means, connective means for removably connecting the battery to the power supply means, first and second transistors regeneratively coupled together, first monitor means for placing said transistors in regenerative conduction when the terminal voltage of the battery has attained a first predetermined value, second monitor means for holding the transistors in conduction while the terminal voltage of the battery exceeds a second predetermined value, disconnect means for cutting off the supply of direct current power to the battery when the transistors are in conduction, and protective means for preventing damage to the first and second monitor means if the battery is connected to the power supply means with reverse polarity, said disconnect means including a latching circuit means for holding the transistors in conduction notwithstanding the reversed polarity of the battery.

2. The device of claim 1 in which the first monitor means includes adjustable means for adjustably setting said first predetermined value.

3. The device of claim 1 in which the first monitor means includes first adjustable means for adjustably setting the first predetermined value of battery terminal voltage at which the first and second transistors will go into regenerative conduction, and the second monitor means includes second adjustable means for adjustably setting the second predetermined value of battery terminal voltage at which the transistors will stop conducting.

4. The device of claim 1 including means for placing the first and second transistors in regenerative conduction and holding said transistors in regenerative conduction when no battery is connected to the charger.

5. The device of claim 1 wherein the protective means also include first and second negative buses across which a diode is placed in such manner so as to assume the full negative voltage of the battery when connected with reverse polarity, and the remainder of the charger remains operative notwithstanding the presence of a negative voltage across the two negative buses.

References Cited

UNITED STATES PATENTS

| | | | |
|---|---|---|---|
| 3,089,998 | 5/1963 | Reuther | 323—22 |
| 3,215,922 | 11/1965 | Olsen et al. | 320—40 |
| 3,217,226 | 11/1965 | Strain | 320—48 |
| 3,237,078 | 2/1966 | Mallory | 320—17 |
| 3,241,029 | 3/1966 | Slomski | 320—40 |

LEE T. HIX, *Primary Examiner.*

S. WEINBERG, *Assistant Examiner.*